United States Patent [19]

Su

[11] Patent Number: 5,782,938

[45] Date of Patent: Jul. 21, 1998

[54] FUEL COMPOSITION

[75] Inventor: Wei-Yang Su, Austin, Tex.

[73] Assignee: Huntsman Petrochemical Corporation, Austin, Tex.

[21] Appl. No.: 862,588

[22] Filed: May 23, 1997

Related U.S. Application Data

[60] Provisional application No. 60/018,157 May 23, 1996.

[51] Int. Cl.$^6$ ............................................. C10L 1/22
[52] U.S. Cl. .................... 44/399; 560/41; 560/169
[58] Field of Search ........................ 44/399; 560/41, 560/169

[56] References Cited

U.S. PATENT DOCUMENTS

| | | | |
|---|---|---|---|
| 4,240,804 | 12/1980 | Shields | 44/399 |
| 4,568,358 | 2/1986 | Courtney | 44/399 |
| 4,758,247 | 7/1988 | Sung | 44/399 |
| 5,203,879 | 4/1993 | Su et al. | 44/419 |
| 5,234,478 | 8/1993 | Su et al. | 44/419 |
| 5,324,833 | 6/1994 | Sieber et al. | 560/41 |
| 5,383,942 | 1/1995 | Su et al. | 44/334 |

*Primary Examiner*—Ellen M. McAvoy
*Attorney, Agent, or Firm*—Jones, O'Keefe & Egan

[57] ABSTRACT

This invention concerns a an amidoalkanolaminoester composition obtained by reacting: (1) a reaction product of dialkyl maleate such as diethyl maleate and an alkylalkanolamine such as N-methylethanolamine; with (2) a hydrocarbyl oxypolyoxyalkene amine represented by the formula

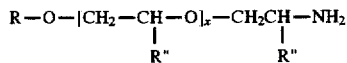

in which R represents an alkyl, an alicyclic, an alkylalicyclic radical having from 12 to 30 carbon atoms, or R'—Ar—; wherein R' represents a hydrocarbyl radical having from 4 to 12 carbon atoms; wherein x has a value of from about 10 to 16; wherein Ar is a divalent aromatic moiety such as divalent benzene; and wherein R" is an ethyl or methyl radical or a mixture of methyl and ethyl radicals. The amidoalkanolaminoester may be used as a fuel additive.

37 Claims, No Drawings

FUEL COMPOSITION

This application claims priority from U.S. Provisional Application Ser. No. 60/018,157, filed May 23, 1996.

BACKGROUND OF INVENTION

This invention generally relates to fuel additives and compositions containing such fuel additives.

There continues to be strong interest in new additives for fuels used in internal combustion engines to improve detergency and the like. Thus, new fuel additives and fuel compositions containing such fuel addives are highly desirable.

SUMMARY OF INVENTION

This invention, in one broad respect, is an amidolalkanolaminoester composition obtained by reacting: (1) a reaction product of dialkyl maleate and N-alkylalkanolamine; with (2) a hydrocarbyl oxypolyoxyalkene amine represented by the formula

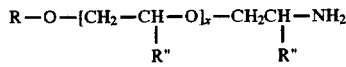

in which R represents an alkyl, an alicyclic, an alkylalicyclic radical having from 12 to 30 carbon atoms, or R'—Ar—; wherein R' represents a hydrocarbyl radical having from 4 to 12 carbon atoms; wherein x has a value of from about 10 to 16; wherein each alkyl in the dialkyl maleate has 1 or 2 carbon atoms; wherein Ar is a divalent aromatic moiety; and wherein R" is an ethyl or methyl radical or a mixture of methyl and ethyl radicals.

In another broad respect, this invention is a fuel additive composition represented by the formula:

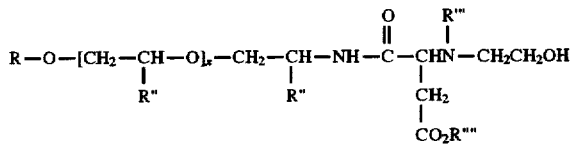

in which R represents an alkyl, an alicyclic, an alkylalicyclic radical having from 12 to 30 carbon atoms, or R'—Ar—; wherein R' represents a hydrocarbyl radical having from 4 to 12 carbon atoms; wherein x has a value of from about 10 to 16; wherein Ar is a divalent aromatic moiety; wherein R" is an ethyl or methyl radical or a mixture of methyl and ethyl radicals; wherein R'" is alkyl having from 1 to 6 carbon atoms; and wherein R"" is alkyl having from 1 to 2 carbon atoms.

In another broad respect, this invention is a process for producing an amidoalkanolaminoester fuel additive composition, the process comprising reacting: (1) a reaction product of dialkyl maleate and N-alkylalkanolamine; with (2) a hydrocarbyl oxypolyoxylalkylene amine represented by the formula

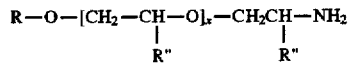

in which R represents an alkyl, an alicyclic, an alkylalicyclic radical having from 12 to 30 carbon atoms, or R'—Ar—; wherein R' represents a hydrocarbyl radical having from 4 to 12 carbon atoms; wherein x has a value of from about 10 to 16; wherein each alkyl in the dialkyl maleate has 1 or 2 carbon atoms; wherein Ar is a divalent aromatic moiety; and wherein R" is an ethyl or methyl radical or a mixture of methyl and ethyl radicals.

In another broad respect, this invention is a gasoline fuel composition containing from about 100 ppm to about 1000 ppm of an additive represented by the formula:

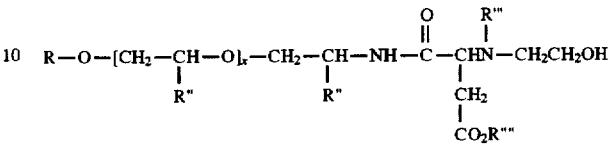

in which R represents an alkyl, an alicyclic, an alkylalicyclic radical having from 12 to 30 carbon atoms, or R'—Ar—; wherein R' represents a hydrocarbyl radical having from 4 to 12 carbon atoms; wherein x has a value of from about 10 to 16; wherein Ar is a divalent aromatic moiety; wherein R" is an ethyl or methyl radical or a mixture of methyl and ethyl radicals; wherein R'" has 1 to 6 carbon atoms; and wherein R"" has 1 to 2 carbon atoms.

In another broad respect, this invention is an amidoalkanolaminoester composition obtained by reacting: (1) a reaction product of diethyl maleate and N-methylethanolamine; with (2) a hydrocarbyl oxypolyoxyalkene amine represented by the formula

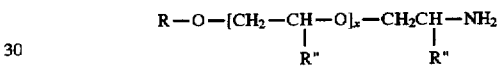

in which R represents an alkyl, an alicyclic, an alkylalicyclic radical having from 12 to 30 carbon atoms, or R'—Ar—; wherein R' represents a hydrocarbyl radical having from 4 to 20 carbon atoms; wherein x has a value of from about 10 to 16; wherein Ar is a divalent aromatic moiety; and wherein R" is an ethyl or methyl radical or a mixture of methyl and ethyl radicals.

The amidoalkanolaminoester may be used as a fuel additive, such as for gasoline, diesel fuel, and the like. Thus, this final reaction product can be used as gasoline detergents/dispersants for intake valve deposit (IVD) purposes.

In another broad respect, this invention is a fuel additive composition represented by the formula:

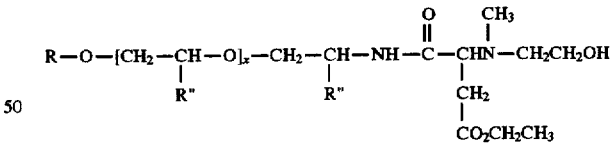

in which R, R', R", and x have the values noted above.

In another broad respect, this invention is a process for producing an amidoalkanolaminoester fuel additive composition, the process comprising reacting: (1) a reaction product of diethyl maleate and N-methylethanolamine; with (2) a hydrocarbyl oxypolyoxylalkene amine represented by the formula

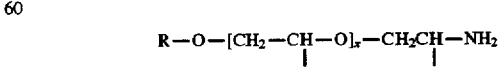

in which R represents an alkyl, an alicyclic, an alkylalicyclic radical having from 12 to 30 carbon atoms, or R'—Ar—; wherein R' represents a hydrocarbyl radical having from 4 to 20 carbon atoms; wherein x has a value of from about 10 to 16; wherein Ar is a divalent aromatic moiety; and wherein R" is an ethyl or methyl radical or a mixture of methyl and ethyl radicals.

In yet another broad respect, this invention is a gasoline fuel composition containing from about 100 ppm to about 1000 ppm of an additive represented by the formula:

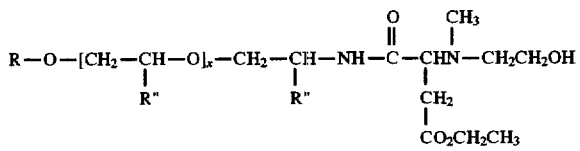

in which R represents an alkyl, an alicyclic, an alkylalicyclic radical having from 12 to 30 carbon atoms, or R'—Ar—; wherein R' represents a hydrocarbyl radical having from 4 to 20 carbon atoms; wherein x has a value of from about 10 to 16; wherein Ar is a divalent aromatic moiety; and wherein R" is an ethyl or methyl radical or a mixture of methyl and ethyl radicals.

DETAILED DESCRIPTION OF THE INVENTION

The following U.S. patents are hereby expressly incorporated by reference: U.S. Pat. Nos. 5,203,879, 5,234,478, and 5,383,942. This invention's improvement over the art is that by introducing an ester group to the molecule, the resulting product should provide better detergency. An effective amount of the final reaction product is used in gasoline or other petroleum distillate fuel as a detergent or dispersing for IVD purposes. In particular, the final reaction product is used in an amount of from about 100 ppm (parts per million) to about 1000 ppm of the fuel composition.

Representative examples of reactants useful in this invention include, but are not limited to: dialkyl maleates such as dimethyl maleate, diethyl maleate, and methylethyl maleate; N-alkylalkanolamines such as N-methylethanolamine; and polyetheramine. The conditions useful for preparing the final reaction product are a temperature range of 0° to 100° C., and pressure range of atmosphere to 500 psig (pounds per square inch). The reaction may be run in a wide variety of reactors, such as a batch reactor.

As discussed above, in one embodiment this invention includes the amidoalkanolaminoester composition obtained by reacting the reaction product of dialkyl maleate and N-alkylalkanolamine, with a hydrocarbyl oxypolyoxyalkene amine. In the composition, each alkyl of the dialkyl maleate may be independently in each occurrence methyl or ethyl. Representative examples of dialkyl maleate include diethyl maleate, dimethyl maleate, or methylethyl maleate. In the aforementioned formula, "Ar" may be divalent benzene, divalent biphenyl, or divalent naphthalene, with divalent benzene being preferred. In the formula, R" may be a mixture of methyl and ethyl radicals. In one embodiment of this invention, "Ar" may be divalent benzene and R' has about 9 carbons. The alkyl of the N-alkylalkanolamine may have from 1 to about 6 carbon atoms. A representative example of the alkylalkanolamine is alkylethanolamine, with one representative example of such N-alkylethanolamine being N-methylethanolamine. In one embodiment, the dialkyl maleate is diethyl maleate or dimethyl maleate; wherein "Ar" is divalent benzene; wherein R" is a mixture of methyl and ethyl radicals; and wherein R' is a mixture of methyl and ethyl radicals.

As discussed above, in one broad respect, this invention is a fuel additive composition represented by the formula:

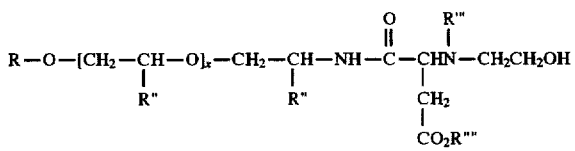

as discussed above. In this fuel composition, "Ar" may be divalent benzene, divalent biphenyl, or divalent naphthalene, with divalent benzene being prferred. In the fuel additive composition, R" may be a mixture of methyl and ethyl radicals. "Ar" can be a divalent benzene, with R' having about 9 carbons. In one embodiment of this invention, "Ar" is divalent benzene; wherein R" is a mixture of methyl and ethyl radicals; and wherein R' is a mixture of methyl and ethyl radicals. In the formula, it is preferred that R'" be methyl. In one embodiment of this invention, R"" is methyl or ethyl.

In the process of this invention, the reacting step can be performed at a temperature in the range of from about 0° C. to about 100° C., and wherein a pressure is maintained in a range from about atmospheric to 500 pounds per square inch. The hydrocarbyl oxypolyoxyalkylene amine can be an animated random butylene oxide and propylene oxide adduct of nonylphenol, wherein the adduct contains from about 4 to about 5 mole butylene oxide and from about 8 to about 10 mole propylene oxide per mole of nonylphenol. As discussed above, each alkyl of the dialkyl maleate, independently in each occurrence, may be methyl or ethyl, and the dialkyl maleate can be diethyl maleate, dimethyl maleate, or methylethyl maleate. "Ar" may be divalent benzene, divalent biphenyl, or divalent naphthalene, with divalent benzene being preferred. In one embodiment of this invention, the amidoalkanolaminoester is of formula:

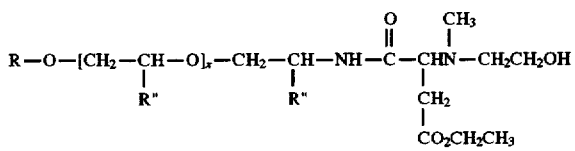

in which R represents an alkyl, an alicyclic, an alkylalicyclic radical having from 12 to 30 carbon atoms, or R'—Ar—; wherein R' represents a hydrocarbyl radical having from 4 to 12 carbon atoms; wherein x has a value of from about 10 to 16; wherein Ar is divalent benzene; and wherein R" is a mixture of methyl and ethyl radicals.

In the gasoline fuel composition containing from about 100 ppm to about 1000 ppm of an additive, in the formula denoted above, "Ar" can be divalent benzene, biphenyl, or naphthalene. Also, R" can be a mixture of methyl and ethyl radicals. In one embodiment, "Ar" is divalent benzene and R' has about 9 carbons. In another embodiment, "Ar" is divalent benzene; wherein R" is a mixture of methyl and ethyl radicals; and wherein R' is a mixture of methyl and ethyl radicals. In addition, R'" can be methyl, and R"" can be methyl or ethyl.

The following examples are illustrative of the present invention and are not intended to be limiting as to the scope of the invention or the claims hereto. Unless otherwise specified, all percentages are by weight.

EXAMPLE 1

Preparation of the Reaction Product of Diethyl Maleate and N-methylethanolamine

To a 500-ml three-neck flask equipped with a stirrer, thermometer, and addition funnel was added 68.8 g of diethyl maleate. N-Methylethanolamine (30.0 g) was added dropwise, and the reaction temperature was kept below 50° C. The resulting product was confirmed by IR spectroscopy.

EXAMPLE 2

Preparation of Amidoalkanolaminoester

To a 500-ml three-neck flask equipped with a stirrer and thermometer was charged 66.8 g of the Example 1 product and 310 g of SURFONAMINE® MNPA-1047 which is an animated random 4.7 mole butylene oxide and 8.8-mole propylene oxide adduct of nonylphenol. The mixture was heated to 60° C. for 40 hours. The resulting product was analyzed by NMR spectroscopy to be the intended amidoalkanolaminoester. This product was tested to be soluble in kerosene.

What is claimed is:

1. An amidolalkanolaminoester composition obtained by reacting:

(1) a reaction product of dialkyl maleate and N-alkylalkanolamine; with (2) a hydrocarbyl oxypolyoxyalkene amine represented by the formula $$R-O-[CH_2-CH-O]_x-CH_2CH-NH_2$$
$$\phantom{R-O-[CH_2-}|\phantom{CH-O]_x-CH_2}|$$
$$\phantom{R-O-[CH_2-}R''\phantom{CH-O]_x-}R''$$

in which R represents an alkyl, an alicyclic, an alkylalicyclic radical having from 12 to 30 carbon atoms, or R'—Ar—;

wherein R' represents a hydrocarbyl radical having from 4 to 12 carbon atoms;

wherein x has a value of from about 10 to 16;

wherein each alkyl of the dialkyl maleate has 1 to 2 carbon atoms;

wherein Ar is a divalent aromatic moiety; and wherein R'' is an ethyl or methyl radical or a mixture of methyl and ethyl radicals.

2. The composition of claim 1, wherein each alkyl of the dialkyl maleate, independently in each occurrence, is methyl or ethyl.

3. The composition of claim 1, wherein the dialkyl maleate is diethyl maleate, dimethyl maleate, or methylethyl maleate.

4. The composition of claim 1, wherein Ar is divalent benzene, divalent biphenyl, or divalent naphthalene.

5. The composition of claim 1, wherein R'' is a mixture of methyl and ethyl radicals.

6. The composition of claim 1, wherein Ar is divalent benzene and R' has about 9 carbons.

7. The composition of claim 1, wherein alkyl of the N-alkylalkanolamine has from 1 to about 6 carbon atoms.

8. The composition of claim 1, wherein the alkylalkanolamine is an alkylethanolamine.

9. The composition of claim 1, wherein the N-alkylethanolamine is N-methylethanolamine.

10. The composition of claim 1, wherein the dialkyl maleate is diethyl maleate or dimethyl maleate; wherein Ar is divalent benzene; wherein R'' is a mixture of methyl and ethyl radicals; and wherein R' is a mixture of methyl and ethyl radicals.

11. A fuel additive composition represented by the formula:

$$R-O-[CH_2-CH-O]_x-CH_2-CH-NH-\overset{O}{\underset{\|}{C}}-\overset{R'''}{\underset{|}{C}}HN-CH_2CH_2OH$$
$$\phantom{R-O-[}|\phantom{CH-O]_x-}|\phantom{CH_2-CH-NH-C-}|$$
$$\phantom{R-O-[}R''\phantom{CH-O]_x}R''\phantom{-CH_2-CH-NH-C-}CH_2$$
$$\phantom{R-O-[CH_2-CH-O]_x-CH_2-CH-NH-C-CH}|$$
$$\phantom{R-O-[CH_2-CH-O]_x-CH_2-CH-NH-C-}CO_2R''''$$

in which R represents an alkyl, an alicyclic, an alkylalicyclic radical having from 12 to 30 carbon atoms, or R'—Ar—;

wherein R' represents a hydrocarbyl radical having from 4 to 12 carbon atoms;

wherein x has a value of from about 10 to 16;

wherein Ar is a divalent aromatic moiety;

wherein R'' is an ethyl or methyl radical or a mixture of methyl and ethyl radicals;

wherein R''' is alkyl having from 1 to 6 carbon atoms; and wherein R'''' is alkyl having from 1 to 2 carbon atoms.

12. The composition of claim 11, wherein Ar is divalent benzene, biphenyl, or naphthalene.

13. The composition of claim 11, wherein R'' is a mixture of methyl and ethyl radicals.

14. The composition of claim 11, wherein Ar is divalent benzene and R' has about 9 carbons.

15. The composition of claim 11, wherein Ar is divalent benzene; wherein R'' is a mixture of methyl and ethyl radicals; and wherein R' is a mixture of methyl and ethyl radicals.

16. The composition of claim 11, wherein R''' is methyl.

17. The composition of claim 11, wherein R'''' is methyl or ethyl.

18. A process for producing an amidoalkanolaminoester fuel additive composition, the process comprising reacting:

(1) a reaction product of dialkyl maleate and N-alkylalkanolamine; with (2) a hydrocarbyl oxypolyoxylalkylene amine represented by the formula $$R-O-[CH_2-CH-O]_x-CH_2CH-NH_2$$
$$\phantom{R-O-[CH_2-}|\phantom{CH-O]_x-CH_2}|$$
$$\phantom{R-O-[CH_2-}R''\phantom{CH-O]_x-}R''$$

in which R represents an alkyl, an alicyclic, an alkylalicyclic radical having from 12 to 30 carbon atoms, or R'—Ar—;

wherein R' represents a hydrocarbyl radical having from 4 to 12 carbon atoms;

wherein x has a value of from about 10 to 16;

wherein Ar is a divalent aromatic moiety; and wherein R'' is an ethyl or methyl radical or a mixture of methyl and ethyl radicals.

19. The process of claim 18, wherein the reacting is performed at a temperature in the range of from about 0° C. to about 100° C., and wherein a pressure is maintained in a range from about atmospheric to 500 pounds per square inch.

20. The process of claim 18, wherein the hydrocarbyl oxypolyoxyalkylene amine is is an animated random butylene oxide and propylene oxide adduct of nonylphenol, wherein the adduct contains from about 4 to about 5 mole butylene oxide and from about 8 to about 10 mole propylene oxide per mole of nonylphenol.

21. The process of claim 18, wherein each alkyl of the dialkyl maleate, independently in each occurrence, is methyl or ethyl.

22. The process of claim 18, wherein the dialkyl maleate is diethyl maleate, dimethyl maleate, or methylethyl maleate.

23. The process of claim 18, wherein Ar is divalent benzene, biphenyl, or naphthalene.

24. The process of claim 18, wherein R" is a mixture of methyl and ethyl radicals.

25. The process of claim 18, wherein Ar is divalent benzene and R' has about 9 carbons.

26. The process of claim 18, wherein alkyl of the N-alkylalkanolamine has from 1 to about 6 carbon atoms.

27. The process of claim 18, wherein the alkylalkanolamine is an alkylethanolamine.

28. The process of claim 18, wherein the N-alkylethanolamine is N-methylethanolamine.

29. The process of claim 18, wherein the dialkyl maleate is diethyl maleate or dimethyl maleate; wherein Ar is divalent benzene; wherein R" is a mixture of methyl and ethyl radicals; and wherein R' is a mixture of methyl and ethyl radicals.

30. The process of claim 18, wherein the amidoalkanolaminoester is of formula:

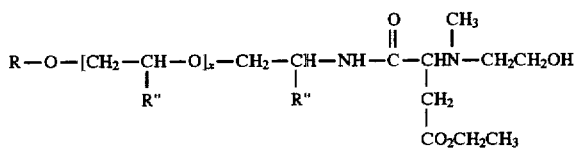

in which R represents an alkyl, an alicyclic, an alkylalicyclic radical having from 12 to 30 carbon atoms, or R'—Ar—; wherein R' represents a hydrocarbyl radical having from 4 to 12 carbon atoms; wherein x has a value of from about 10 to 16; wherein Ar is divalent benzene; and wherein R" is a mixture of methyl and ethyl radicals.

31. A gasoline fuel composition containing from about 100 ppm to about 1000 ppm of an additive represented by the formula:

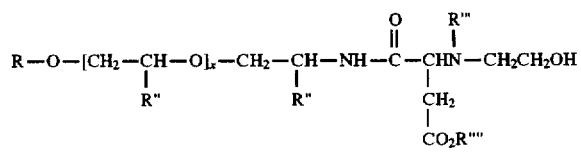

which R represents an alkyl, an alicyclic, an alkylalicyclic radical having from 12 to 30 carbon atoms, or R'—Ar—;

wherein R' represents a hydrocarbyl radical having from 4 to 12 carbon atoms;

wherein x has a value of from about 10 to 16;

wherein Ar is a divalent aromatic moiety;

wherein R" is an ethyl or methyl radical or a mixture of methyl and ethyl radicals;

wherein R'" has from 1 to 6 carbon atoms; and wherein R"" has from 1 to 2 carbon atoms.

32. The composition of claim 31, wherein Ar is divalent benzene, biphenyl, or naphthalene.

33. The composition of claim 31, wherein R" is a mixture of methyl and ethyl radicals.

34. The composition of claim 31, wherein Ar is divalent benzene and R' has about 9 carbons.

35. The composition of claim 31, wherein Ar is divalent benzene; wherein R" is a mixture of methyl and ethyl radicals; and wherein R' is a mixture of methyl and ethyl radicals.

36. The composition of claim 31, wherein R'" is methyl.

37. The composition of claim 31, wherein R"" is methyl or ethyl.

* * * * *